United States Patent [19]

Parker

[11] Patent Number: 5,706,439

[45] Date of Patent: Jan. 6, 1998

[54] METHOD AND SYSTEM FOR MATCHING PACKET SIZE FOR EFFICIENT TRANSMISSION OVER A SERIAL BUS

[75] Inventor: Tony E. Parker, Boca Raton, Fla.

[73] Assignee: International Business Machines Corporation, Armonk, N.Y.

[21] Appl. No.: 313,680

[22] Filed: Sep. 27, 1994

[51] Int. Cl.$^6$ ................................................. G06F 13/38
[52] U.S. Cl. ........................ 395/200.17; 395/200.13; 370/476; 370/506
[58] Field of Search ................................. 395/280, 284, 395/200.13, 200.17; 370/82, 84, 94.1, 476, 506

[56] References Cited

U.S. PATENT DOCUMENTS

| | | | |
|---|---|---|---|
| 5,058,108 | 10/1991 | Mann et al. | 370/85.1 |
| 5,323,396 | 6/1994 | Lokhoff | 370/94.1 |
| 5,353,287 | 10/1994 | Kuddes et al. | 370/85.2 |
| 5,469,549 | 11/1995 | Simpson et al. | 395/200.08 |

OTHER PUBLICATIONS

"IEEE Standard for a High Performance Serial Bus", The Institute Of Electrical And Electronic Engineers, Inc., Draft 7.1v1, IEEEP1394, Aug. 5, 1994.

Marazas, et al., "Information Technology—SCSI-3 Serial Bus Protocol (SBP)", X3T10 992D, Rev. 18, Working Draft, Aug. 11, 1994.

Primary Examiner—Jack B. Harvey
Assistant Examiner—Jeffrey K. Seto
Attorney, Agent, or Firm—Andrew J. Dillon; George E. Grosser

[57] ABSTRACT

A computer system that is able to specify a packet size transmission rate is disclosed. The computer system has a plurality of nodes, each node being serially connected on a P1394 bus to at least one other node in the computer system. The nodes communicate one to another by transmitting communication packets having variable byte sizes over the P1394 bus. The packet size transmission rate is specified by first establishing an average transmission of bytes per packet. Next, the system determines an approximate value of the average transmission rate and, based on this value, determines a periodic change on the average transmission rate for transmitting communication packets of length l or length l+1. Once the periodic change is understood, the system selects a repeating pattern for generating a sequence of packets representing this approximate value. This sequence allows for an even transmission distribution of l and l+1 packets. The system bases its selection on checking the repeating pattern to determine whether the transmission rate should change from l to l+1 or vice versa and changing the transmission rate upon indication that a change is necessary.

8 Claims, 12 Drawing Sheets address: X'0198' (port 0)
address: X'01B8' (port 1)

| reserved | Seconds_Count/Cycle_Count |
|---|---|
| 31        20 | 19                        0 | pwr reset: X'........'
cmd reset: X'........'

*Fig. 14* address: X'019C' (port 0)
address: X'01BC' (port 1)

| SYNCH_PERIOD |
|---|
| 31                                          0 | pwr reset: X'........'
cmd reset: X'........'

*Fig. 15* address: X'01CC' (port 0)
address: X'01EC' (port 1)

| Isochronous Receive Buffer Address Register Port n |
|---|
| 31                                                0 | pwr reset: X'........'
cmd reset: X'........'

*Fig. 16* address: X'01D0' (port 0)
address: X'01F0' (port 1)

| Receive Buffer Size | reserved | I | L |
|---|---|---|---|
| 31            16 | 15              2 | 1 | 0 | pwr reset: X'........'
cmd reset: X'........'

*Fig. 17* address: X'01D4' (port 0)
address: X'01F4' (port 1)

pwr reset: X'........'
cmd reset: X'........' address: X'01D8' (port 0)
address: X'01F8' (port 1)

pwr reset: X'........'
cmd reset: X'........' address: X'01DC' (port 0)
address: X'01FC' (port 1)

pwr reset: X'........'
cmd reset: X'........'

Where:
 addr_reg n is Control Address Register Transmit Port n
 cntl_reg n is Control Register Transmit Port n

METHOD AND SYSTEM FOR MATCHING PACKET SIZE FOR EFFICIENT TRANSMISSION OVER A SERIAL BUS

CROSS-REFERENCE TO RELATED APPLICATION

The present application is related to U.S. patent application No. 08/312,854, entitled "Acyclic Cable Bus Having Redundant Path Access", U.S. patent application No. 08/313,679, entitled "Method For Generating Topology Map For A Serial Bus", U.S. patent application No. 08/313,483, entitled "Method For Selecting Transmission Speeds For Transmitting Data Packets Over A Serial Bus", U.S. patent application No. 08/312,746, entitled "Method And System For Determining Maximum Cable Segments On A Serial Bus Having Multiple Transmission Rates", U.S. patent application No. 08/313,490, entitled "Method And System For Automatically Generating A Read Response Packet With Speed Matching Over A Serial Bus", U.S. patent application No. 08/313,683, entitled "Method And System For Dynamically Appending Data To Data Structures For Transmission Over A Serial Bus", and all filed of even date herewith by the inventors hereof and assigned to the assignee herein, and incorporated by reference herein.

BACKGROUND OF THE INVENTION

1. Technical Field

The present invention relates generally to data transmission over a computer system and, more particularly, to a method of specifying the data rate of asynchronous data transmission over a computer system. More specifically, the present invention relates to a method for matching packet size transmission over an acyclic serial bus in a computer system.

2. Description of the Related Art

The IEEE has established a new serial bus standard under P1394 High Performance Serial Bus. A bus protocol has also been established under SCSI-3 Serial Bus Protocol, which defines a method of specifying the data rate of isochronous data transmission on the P1394 Serial Bus. The data rate is determined to be a number of bytes to be transmitted per packet, where 8,000 packets per second are transmitted. This rate is equal to R=I (Integer)+N (Numerator)/D (Denominator), where I is a 32 bit binary integer and N and D are both 16 bit binary integers, for which N<D. This rate R should be the average number of bytes per packet transmitted and leads to odd transmission rates in many cases.

One solution to this problem is to specify that N packets of length, l+1, followed by D-N packets of length l be transmitted every D packets, but this has the undesirable side effect of requiring the recipient of the stream to be capable of buffering up to an additional N bytes (assuming the system uses the received data at a fixed rate R). Further, this solution introduces an additional latency of N up to (N bytes/R((bytes/seconds)×8,000))=(1/8,000) N/R seconds.

Preferably, it is desirable to determine after each packet whether the cumulative data rate of packets sent is more than or less than R. If more than R, the system should send l bytes in the next packet, and if less than R, the system should send l+1 bytes in the next packet. This calculation requires a repeated calculation of the cumulative data rate over time after each packet has been sent and this calculation requires the use of division to carry out exactly. A drawback of using this implementation is that division algorithms and hardware are relatively expensive in terms of silicon area required.

Accordingly, what is needed is a less complicated and more simplified method of approximating the results of this calculation for all values of R+l+N/D of practical interest, while minimizing buffer and latency tolerance requirements. This method should also be able to calculate the values of practical interest, which include such odd data rates as, for example, 44,100 bytes per second (R=5+41/80), 44,056 bytes per second (R=5+507/1000), 11,025 bytes per second (R=1+121/320), and 22,050 bytes per second (R=2+121/160).

SUMMARY OF THE INVENTION

It is therefore one object of the present invention to provide data transmission over a computer system.

It is another object of the present invention to provide a method of specifying the data rate of asynchronous data transmission over a computer system.

It is yet another object of the present invention to provide a method for matching packet size transmission over an acyclic serial bus in a computer system.

According to the present invention, a computer system that is able to specify a packet size transmission rate is disclosed. The computer system has a plurality of nodes, each node being serially connected on a P1394 bus to at least one other node in the computer system. The nodes communicate one to another by transmitting communication packets having variable byte sizes over the P1394 bus. The packet size transmission rate is specified by first establishing an average transmission of bytes per packet. Next, the system determines an approximate value of the average transmission rate and, based on this value, determines a periodic change on the average transmission rate for transmitting communication packets of length l or length l+1. Once the periodic change is understood, the system selects a repeating pattern for generating a sequence of packets representing this approximate value. This sequence allows for an even transmission distribution of l and l+1 packets. The system bases its selection on checking the repeating pattern to determine whether the transmission rate should change from l to l+1 or vice versa and changing the transmission rate upon indication that a change is necessary.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 14 depicts the isochronous transmit seconds/cycle count register port N, which uses a seconds/cycle count bits block to identify the P1394 cycle number on which an event, such as a pause, resume, start, or stop, is to occur on this channel;

FIG. 15 depicts an isochronous transmit synch period register port N, which is used to identify the number of packets to be transmitted from one start of synch packet to the next start of synch packet on this channel;

FIG. 16 depicts an isochronous receive buffer address register port N, which is used to store the buffer address pointer when the link chip fetches a receive control block for port N;

FIG. 17 depicts an isochronous receive buffer size register port N, which is used to store the buffer side quadlet when the link chip fetches a receive control block for port N;

DETAILED DESCRIPTION OF PREFERRED EMBODIMENT

Figure 1A:
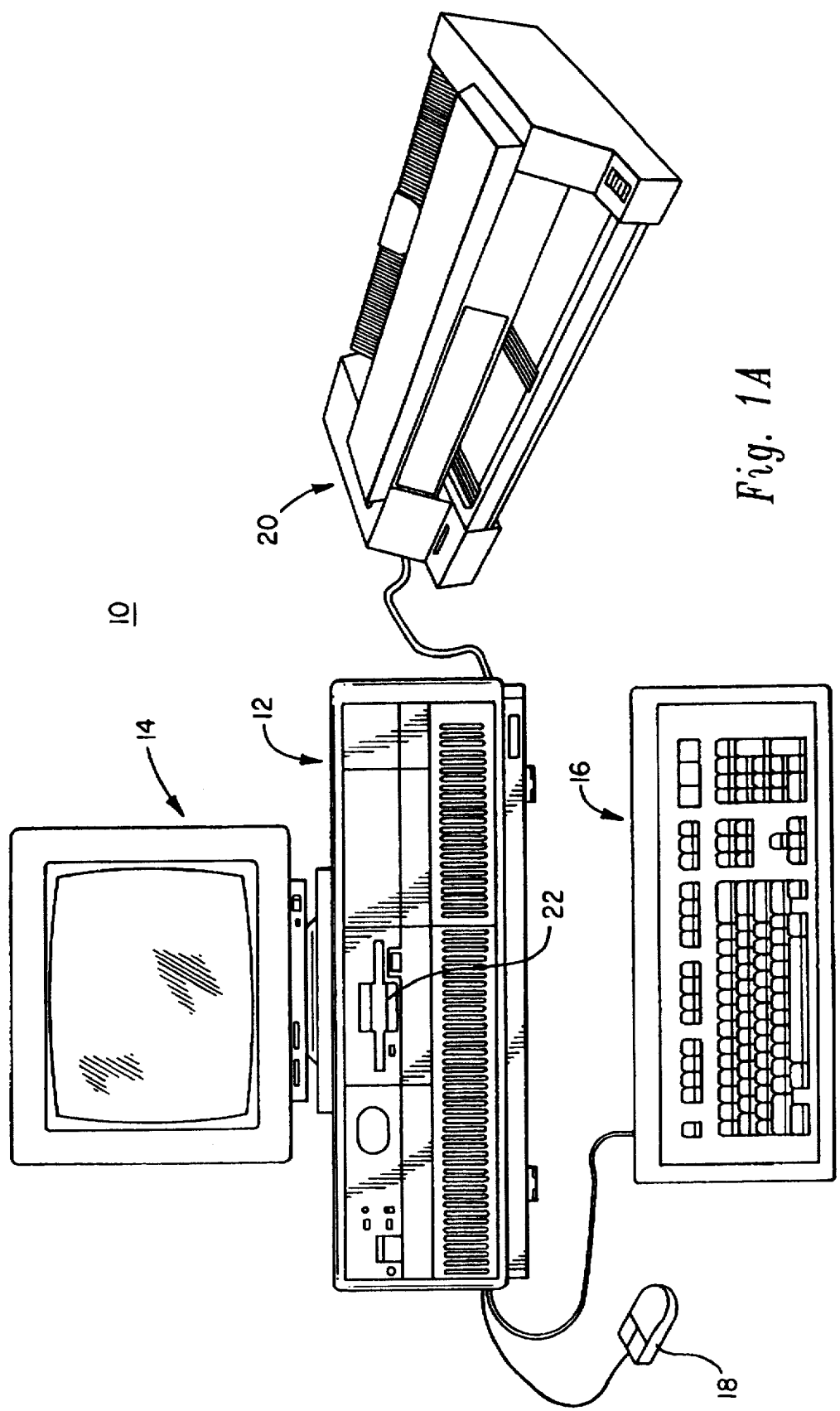
FIG. 1A depicts a data processing system in the form of a personal computer in which the present invention can be employed is depicted.

Referring now to the figures, and in particular to FIG. 1A, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as floppy diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 1B:
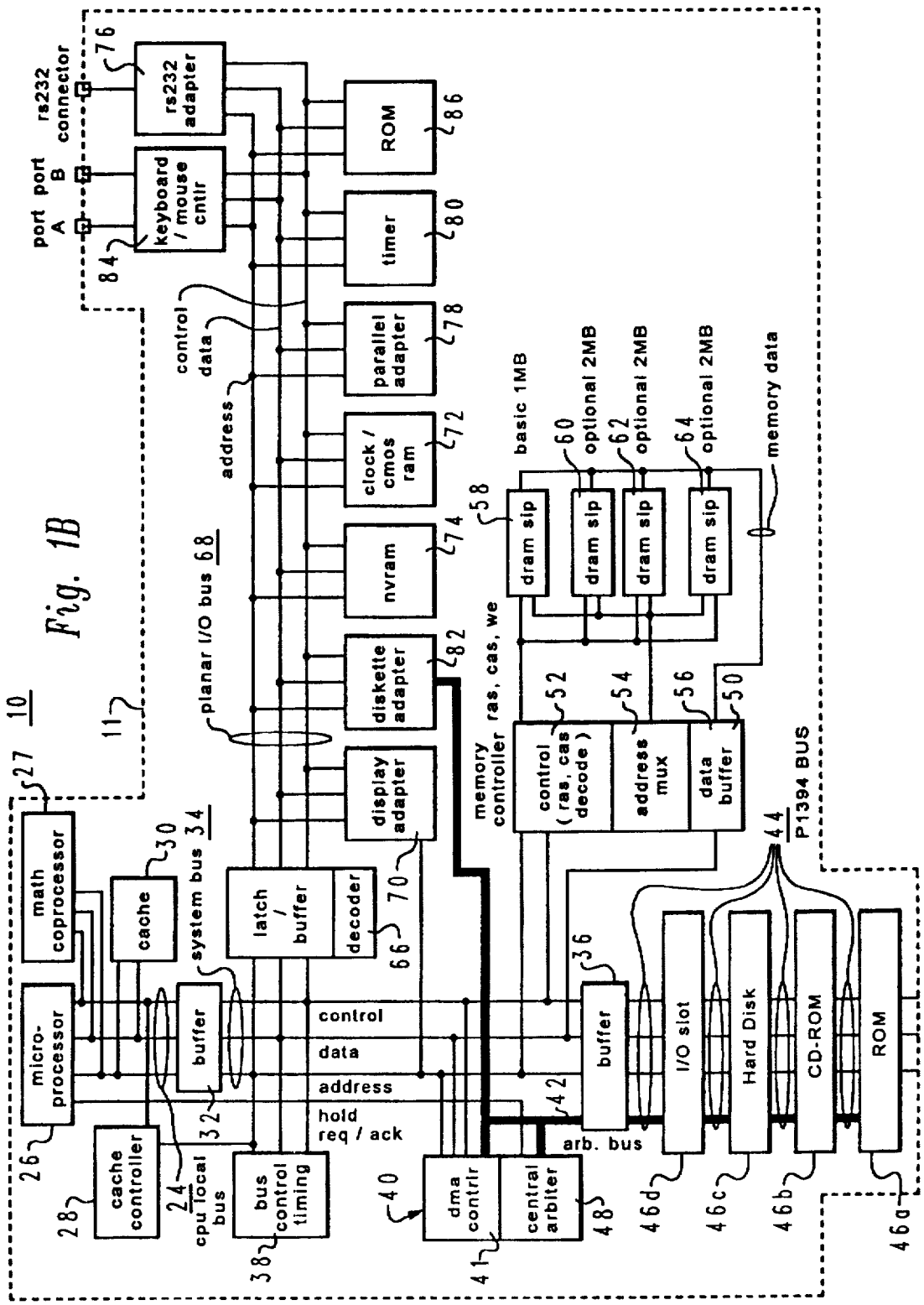
FIG. 1B is a block diagram of a personal computer system illustrating the various components of personal computer system in accordance with the present invention.

Prior to relating the above structure to the present invention, a summary of the operation in general of personal computer system 10 may merit review. Referring to FIG. 1B, there is shown a block diagram of personal computer system 10 illustrating the various components of personal computer system 10 in accordance with the present invention. FIG. 1B further illustrates components of planar 11 and the connection of planar 11 to I/O slots 46a–46d and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 1B, it is to be understood at the outset of the description Which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 1B, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and a serial bus such as the P1394 Serial Bus 44. Connected to bus 44 are a plurality of I/O slots 46a–46d for receiving P1394 adapter cards, which may be further connected to an I/O device or memory. In the depicted example, I/O slot 46a has a hard disk drive connected to it; I/O slot 46b has a CD-ROM drive connected to it; and I/O slot 46c has a ROM on an adapter card connected to it. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexor 54, and a data buffer 56. Memory control unit 50 is further connected to a random access memory as represented by RAM module 58. Memory controller 52 includes the logic for mapping addresses to and from CPU 26 to particular areas of RAM 58. While the personal computer system 10 is shown with a basic 1 megabyte RAM module, it is understood that additional memory can be interconnected as represented in FIG. 1B by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Since under the IEEE P1394 High Performance Serial Bus Standard and SCSI-3 Serial Bus Protocol, both herein incorporated by reference, the Isochronous Channel Data transmission rate is set as being rate R=Integer I+Numerator N/Dominator D, which establishes the average number of bytes per packet transmitted on that channel. The task then becomes to determine, for each isochronous packet transmission, whether the packet should contain l bytes or l+1 bytes. A simple approximation is to represent N/D as W/X, plus or minus (+/–) Y/Z, where W/X is a "simple to generate" data rate, such as, for example, W/5, W/8, W/7, or W/8, and approximates closely the data rate of N/D, then +or –Y/Z is represented as a periodic change in the pattern generated for W/X.

By carefully selecting the repeating pattern that generates the sequence of packets representing the data rate W/X, the system ensures that from the start of the data stream to any point in the data stream, the difference in data rate for W/X is no more than plus or minus one byte. This is done by selecting patterns that evenly distribute to the extent possible the l and l+1 packets rather than bunching l length packets in one portion of the data stream and l+1 length packets in another.

When W/X is not equal to N/D, it is necessary to modify periodically the stream of packets generated by W/X in order to make it equal to N/D. This is done by taking the difference between N/D and W/X, and calling it +/– Y/Z, and ensuring that for every Z packets, Y of them are changed either from l to l+1, if the difference is positive, or l+1 to l, if the difference is negative. It is also necessary to spread the Y changes over Z packets evenly in order to minimize the difference in data rate, now a difference from N over D or N/D, from the start of the stream to any particular point in the stream.

Figure 2:
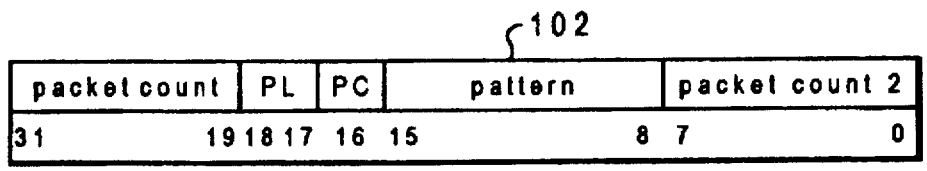
FIG. 2 illustrates a sample control register format.

A sample control register 102 format is illustrated in FIG. 2. The packet count block, or Z, represents the number of packets that are to be transmitted using the patterns specified in bits 15-8 before repeating the pattern from the beginning. The pattern block, or W, represents the bit field read from left to right, repeatedly, 1 bit per Cycle starts and where "0" indicates "transmit a pattern of length l" and "1" indicates "transmit a pattern of length l+1." The PL block, or X, represents the length of the pattern field in bits 15-8 where "'00'=5 bits; '01'=6 bits; '10'=7 bits; and, '11'=8 bits." This pattern length determines the effective "length" of a left circular shift register, later depicted and discussed below, by determining to which bit in the shift register the leftmost bit is circulated.

The PC block (or bit) represents the "pattern change" where "1" indicates that when packet count 2 indicates a pattern change, then the system is to substitute "transmit a pattern of length l+length l+1" the next time that the pattern indicates "transmit a pattern of length l" when the PC block is "0", this indicates that when packet count 2 indicates a pattern change, then the system is to substitute "transmit a pattern of length l" the next time that the pattern block indicates "transmit a pattern of length l+1." The PC bit also indicates whether the difference between N/D and W/X is positive or negative. The packet count 2 block, or Y, indicates that, beginning at (packet count 2)/2, the system is to perform a pattern change every "packet count 2" packets. If the packet count 2 block equals 0, then no pattern change is to occur.

While the particular limitations of the size of counters, registers, and shift registers may prevent the implementation of certain values of N/D, it is understood to those skilled in the art that the control register may be adjusted to accommodate any value of N/D that may be implemented according to this method.

Figure 3:
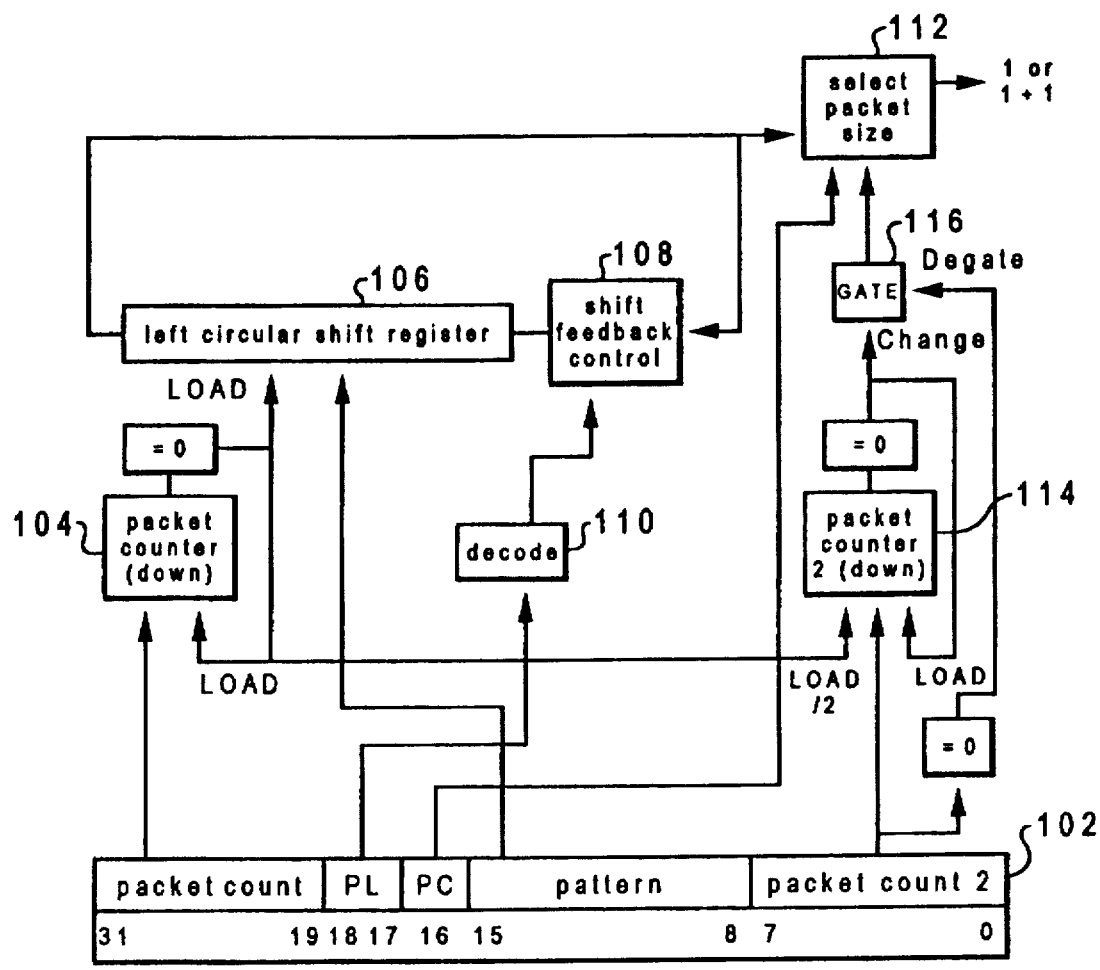
FIG. 3 represents a dataflow diagram of the information found in the control register of FIG. 2.

FIG. 3 represents a dataflow diagram of the information found in control register 102 of FIG. 2. Initially, the system loads the appropriate values into control register 102 based on the numerator "N" and denominator "D" values defined for this stream. The system also determines whether a particular set of N/D values cannot successfully be programmed and, therefore, aborts the stream set up and indicates that the resources are not available. The packet count block is loaded into packet counter 104, which counts down from the number loaded until 0. The pattern for transmitting is loaded into left circular shift register 106, which is connected to shift feedback control 108. Shift feedback control 108 is also connected to a decode circuit 110, from which it obtains the pattern change criteria from the PL bit, and feedback from the output of left circular shift register. Left circular shift register 106 further connects to select packet size logic 112, which selects either 1 or l+1. The PC bit acts upon select packet size logic 112 to aid in selecting whether to transmit an l or l+1 data packets. The packet count 2 field load into the packet counter 2 logic 114, which counts down to 0.

If register 102 is loaded, then counter 104, register 106, and counter 114 are loaded from "packet count" field, "pattern" field, and "packet count 2" field shifted right by one bit ("divided by 2"), respectively, of register 102. It is assumed that register 102 will be loaded prior to activating packet data transmission on this isochronous channel.

Every time an isochronous packet is prepared for transmission on a particular channel the output of logic 112 selects whether the packet data will be of length l or of length l+1. Unless "packet counter 2" 114 has counted down to equal 0 and no "pattern change" has since occurred, then the packet data length will be l if the value of the leftmost bit of register 106 is a "0" and will be l+1 if the value of the leftmost bit of register 106 is a "1". If the "packet counter 2" 114 has counted down to equal 0 and no "pattern change" has since occurred (and the "packet count 2" field in register 102 does not equal 0), then if the PC bit field value in register 102 is not equal to the leftmost bit of register 106 then the value of the PC bit field will replace the leftmost bit of register 106 in logic 112 for the purpose of determining whether the packet data length will be l or l+1 (this being referred to as a "pattern change").

Following the selection of the packet data length, the following two events occur:

EVENT 1:
If "packet counter" 104 is zero, then the "packet count" field of register is loaded into "packet counter" 104, the "pattern" field of register 102 is loaded into register 106, and the "packet count 2" field shifted right by one bit position ("divided by 2") is loaded into the "packet counter 2" counter 114.

EVENT 2:
If the "packet counter" 104 is not zero, then the following four events occur:

EVENT 1:
The value in the "packet counter" 104 is decremented by 1.

EVENT 2:
The register 106 is shifted left circular by one bit position with the leftmost bit being shifted into one of the four rightmost bits as determined by the PL field in register 102 such that the decode 110 of the PL field controls logic 108 to control the feedback path of the leftmost bit of register 106 creating a left circular shift register 106 of effective length 5,6,7, or 8 bits as determined by the PI field in register 102.

EVENT 3:
If the "packet counter 2" 114 is non-zero, it is decremented.

EVENT 4:
If the "packet counter 2" 114 is zero, it is loaded from the "packet count 2" field of register 102.

An example of all possible representations of N/D where D equals 80 and from the patterns, where PL equals 8 is found in the list in Table 1.

Another example is where the length of the pattern in "patterns" is equal to PL where N equals 7 and D equals 41.

| N/D = | (patterns) | byte_count | PC | (byte_count_2) |
|---|---|---|---|---|
| 7/41 | (00001000) | 328 | 1 | (22) 56/328 = 1/8 + 15/328 |
| 7/41 | (0001000) | 287 | 1 | (36) 49/287 = 1/7 + 8/287 |
| 7/41 | (000100) | 246 | 1 | (246) 42/246 = 1/6 + 1/246 |
| 7/41 | (00100) | 205 | 0 | (34) 42/246 = 1/5 − 6/205 |
| 7/41 | (001000) | 41 | X | (0) 7/41 = 6X(001000)l (00100) |

Examples of data rate requirements are listed in the table below.

| N/D = | (patterns) | byte_count | PC | (byte_count_2) | |
|---|---|---|---|---|---|
| 41/80 | (10101010) | 80 | 1 | (80) | CD 44.1 KHz |
| 507/1000 | (10101010) | 1000 | 1 | (143) | Satellite 44.056 KHz |
| 121/320 | (01001001) | 320 | 1 | (320) | PC Audio 11.025 KHz 121/320 = 3/8 + 1/320 |
| 121/320 | (01010) | 320 | 0 | (46) | PC Audio 11.025 KHz 121/320 = 2/5 − 7/320 |
| 121/160 | (11011101) | 320 | 1 | (160) | PC Audio 22.05 KHz 121/160 = 6/8 + 1/160 |
| 121/160 | (11011) | 320 | 0 | (23) | PC Audio 22.05 KHz 121/160 = 4/5 − 7/160 |

Figure 4:
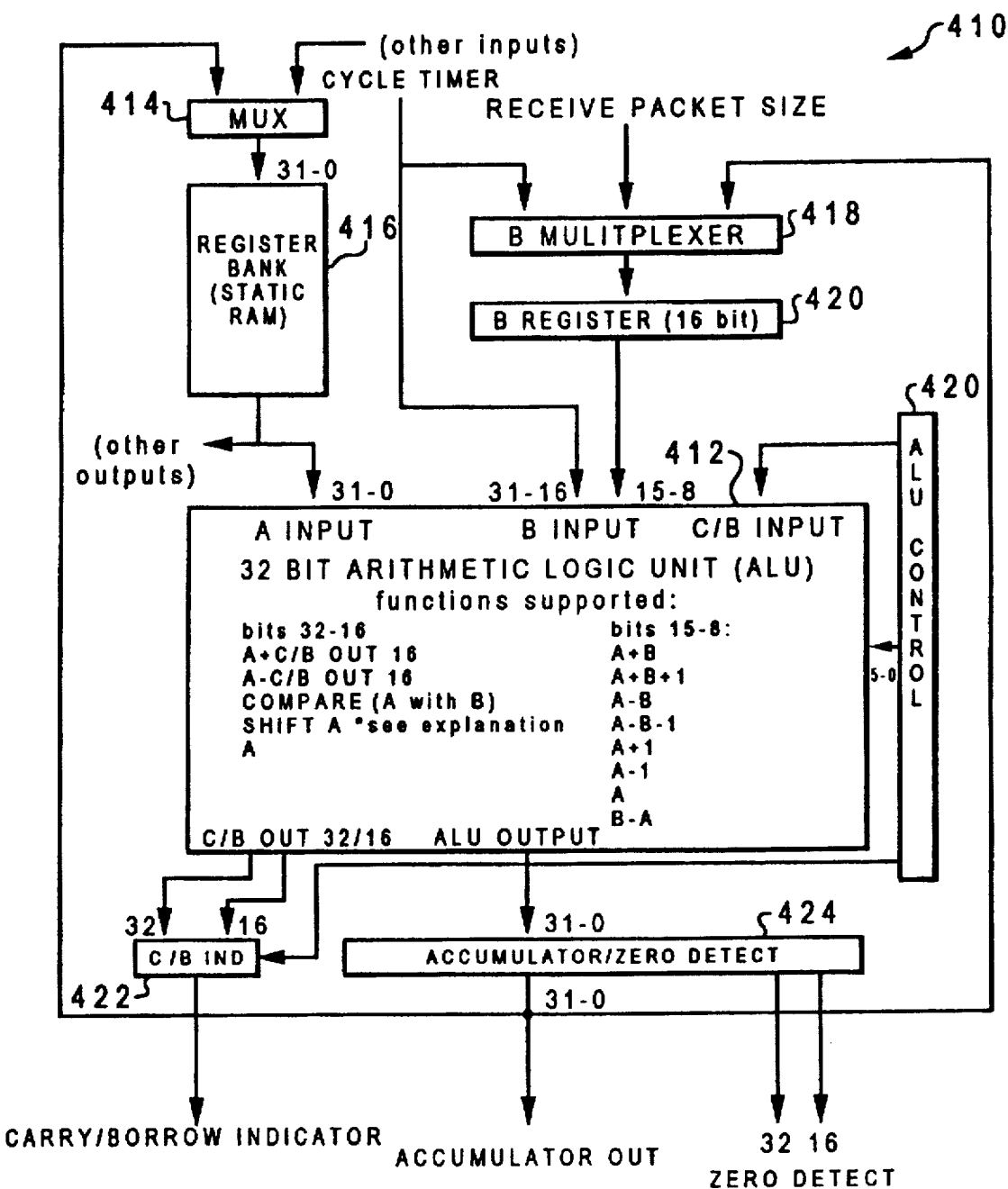
FIG. 4 illustrates a dataflow diagram, with associated state machine mechanisms for sequencing and utilizing this dataflow.

The implementation of FIG. 3 covers only a one channel implementation. Multiple asynchronous transmit channels may also be more efficiently used. A dataflow diagram, with associated state machine mechanisms, for sequencing and utilizing this dataflow is illustrated in FIG. 4. State machine 410 includes a multipurpose arithmetic logic unit (ALU) 412, that processes 32 bits at a time. A first multiplexor (MUX) 414 is fed with data from accumulator register 424 add other inputs for directing the appropriate data to register bank 416, which may be constructed of static memory. Register bank 416 feeds into the A input of ALU 412, or to other inputs, (not shown). A second or B multiplexor 418 receives the same data information as does multiplexor 414, but also receives the packet size information as well as a cycle timer control signal. Multiplexor 418 shifts data to B register 420, which holds 16 bits at a time. B register 420 and the cycle timer feed into the B input of ALU 412. B register 420 covers bits 15-0 and cycle timer covers bits 31-16. An ALU control unit 422 is used to control the carry/borrow input, as well as other functions of the ALU 412. A carry/borrow output 2 bits 32 and 16 feed into carry and borrow indicator 424. The carry/borrow out bit 16 is the arithmetic carry or borrow (depending on ALU operation specified by the ALU control register 420, addition operations may result in carrys while subtraction operations may result in borrows) out of the ALU 412 bit 15. The carry/borrow out bit 32 is the arithmetic carry or borrow (depending on ALU operation specified by the ALU control register 420, addition operations may result in carrys while subtraction operations (including COMPARE (A with B)) may result in borrows; the SHIFT A operation will also set the carry/borrow out bit 32 to the value of A input bit 31 as part of the "shift left circular" operation) out of the ALU 412 bit 31. Depending on the ALU operation specified by the ALU control register 420, either the carry/borrow out bit 16 or the carry/borrow out bit 32 will be latched into the carry/borrow Indicator 422 at the conclusion of each ALU 412 operation, at the same time that the ALU output bits 31-0 are latched into the accumulator register 424. The zero detect logic 424 bit 16 detects whether the output bits 15-0 of accumulator register 424 are all equal to zero. The zero detect logic 424 bit 32 detects whether the output bits 31-0 of the accumulator register 424 are all equal to zero. Lastly, the ALU output bits 31-0 from ALU 412 feeds to an accumulator register/zero detect logic 426, which proceeds to accumulator out bits 31-0 and zero detect bits 32 and 16. Accumulator out bits 31-0 also proceed to MUX 414 (the output of which proceed to the input to register bank 416) and via 410 to B Multiplexor 418.

ALU 412, being a 32 bit ALU, can support several functions. These include, for bits 32-16: A+C/B out line 16, A−C/B out line 16, compare "A with B", shift A, and A. For bits 15-0, the functions supported are: A+B, A+B+1, A−B, A−B−1, A+1, A−1, A, and B−A. The shift A function of ALU 412 performs a left shift on the high order 8 bits, bits 31-24, of input A by one bit, with either bits 31, 30, 29, or 28 of input A being circularly shifted into bit 24 of the accumulator based on the pattern length field, bits 23 and 22 of input A. Bits 23-16 of input A are propagated to the accumulator unshifted.

Figure 5:
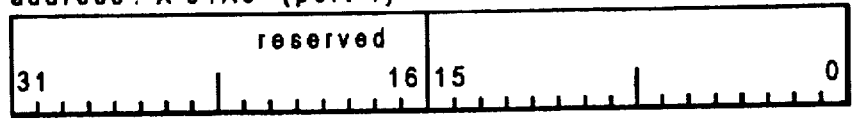
FIG. 5 depicts an isochronous transmit data rate A register port N.

For each transmit channel link, there are five registers in the register bank for use in calculating the transmit packet size. The first register, represented in FIG. 5 is the Isochronous Transmit Data Rate A Register Port n. This register holds the integer byte count representing the integer number of bytes per packet to be transmitted. Where the data stream rate is represented as R=l+N/D average packet size, this register holds the value of l. The maximum allowed value of l is dependent on the maximum isochronous packet size supported and it is the responsibility of the system to insure that the value of l, as programmed in this register, plus header and N/D, if any, does not cause that threshold to be exceeded. The Reserved field must be set to zero when written and the contents of this field when read are "don't care."

Figure 6:
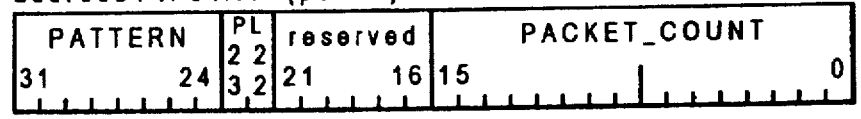
FIG. 6 illustrates the second register is the isochronous transmit data rate B register port N.

The second register is the Isochronous Transmit Data Rate B Register Port n illustrated in FIG. 6. This register holds information related to the count representation of the fractional portion of the average number bytes per packet to be transmitted. Where the data stream rate is represented as R=l+N/D average packet size, this register holds the information calculated by the system, which is related to N/D. The maximum values of the information allowed in each field as derived by the system from N/D, is dependent on the size of these fields and it is the responsibility of the system to insure that the values of N and D are such that there exists a set of values for the information in each field that represents N/D while still being programmable. If N/D is such that no such values can be derived, then the system must respond to the Stream Login with status indicating the resources are not available to establish the stream.

The Register Port in FIG. 6 includes a Pattern field, a PL field, a reserved field, and a PACKET_COUNT field. The Pattern field is an 8-bit pattern, with 5 to 8 bits of which are used by the system to calculate whether l bits or l+1 bits are to be transmitted in each packet in this stream. The PACKET_COUNT block represents the number of packets to send based on the determination of which fields from this register and the Transmit Isochronous Data Rate C Port n register before starting over from the beginning using the data preserved in these registers. At the beginning, the system reloads all counters and shift registers used to calculate whether l bytes or l+1 bytes are to be transmitted in each packet in this stream. A B'1' (or binary 1) in the pattern field indicates that l+1 bits are to be transmitted in a particular packet, while a B'0'in the pattern field indicates that l bits are to be transmitted in a particular packet.

The pattern field is copied from this register into circular shift left register 104 of length PL at stream activation. The first packet transmitted contains the either l or l+1 bytes based on the contents of the left most bit of the shift register. After the length of that packet is determined, the register is shifted and the process repeats for the next packet to be transmitted. After PACKET_COUNT packets have been transmitted, the shift register is reloaded from the pattern field.

The PL field is used to select the length of the pattern field to be used in the procedure that determines on each cycle whether a packet of l bits to l+1 bits is to be transmitted from this port. Where B'00' is found, the pattern length is set at 5 bits, using bits 4-0 from the pattern field. Where B'01'is found, the pattern length is set at 6 bits, using bits 5-0 from the pattern field. Where B'10' is found, the pattern length is set at 7 bits, using bits 6-0 from the pattern field. Where B'10' is found, the pattern field is set at 8 bits, using bits 7-0 from the pattern field. The reserved bit field must be set to zero when written and the contents of this field when read are "don't care".

Figure 7:
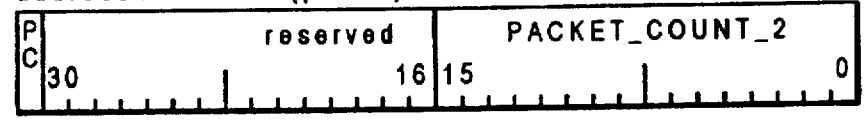
FIG. 7 illustrates the isochronous transmit data rate C register port N.

The next transmit data register is the Isochronous Transmit Data Rate C Register Port n and is illustrated in FIG. 7. This register holds information related to the count representation of the fractional portion of the average number of bytes per packet to be transmitted. Where the data stream rate is represented as R=l+N/D average packet size, this register holds the information calculated by the system that is related to N/D. The maximum allowed values of the information in each field derived by the system from N/D is dependent on the size of these fields. It is the responsibility of the system to insure that the values of N and D are such that there exists a set of values for the information in each field that represents N/D while still being programmable. If N/D is such that no such values can be derived, then the system must respond to the Stream Login with status indicating that resources are not available to establish the stream. Stream Login is the procedure defined in the SCSI-3 Serial Bus Protocol (ANSI X3T10) draft standard that specifies that devices that wish to communicate using Isochronous streams (channels) must first request (using Asynchronous Data Packets) the use of an Isochronous stream with details on stream data rate, etc.

The PC bit in FIG. 7 is the Packet Change bit and is set to determine the type of change to make to the left most output of the shift register, which determines whether a packet of l bytes or l+1 bytes is to be transmitted from this port. Each time that the counter whose value is set based on the value of PACKET_COUNT_2 counts down to zero, a Pattern Change takes place based on the value of PC on the next packet for which that particular change can occur. A binary value of zero indicates that a change of the next packet is required for which the shift register output would indicate a length of l+1 to a packet with length of l. A binary of value of 1 indicates that the system changes the next packet for which the shift register output would indicate a length of l to a packet with a length of l+1. The reserved section must be set to zero when written and the contents of this field are "don't care" when read.

The PACKET_COUNT_2 field in FIG. 7 represents the number of packets from one packet change to the next packet change. During operation, PACKET_COUNT_2/2 (truncated), i.e. PACKET_COUNT_2 right shifted, is loaded into a down counter at the same time that PATTERN and PACKET_COUNT are loaded from the Transmit Isochronous Data Rate B Register Port n. When this counter reaches zero, a Packet Change is registered. On the following decrement signal, the counter is loaded with PACKET_COUNT_2 (not shifted) instead of decremented. The counter continues to decrement on each packet transmission and indicates a Pattern Change upon reaching zero, then reloads with PACKET_COUNT_2 until PACKET_COUNT reaches zero and all registers and counters are reloaded with their original values, such as, for example, PACKET_COUNT_2/2 for this counter. The first Packet Change occurs at or following PACKET_COUNT_2/2 (truncated) packets into the transmission and then every PACKET_COUNT_2 packets thereafter until PACKET_COUNT reaches zero and the shift registers and counters are reloaded.

Figure 8:
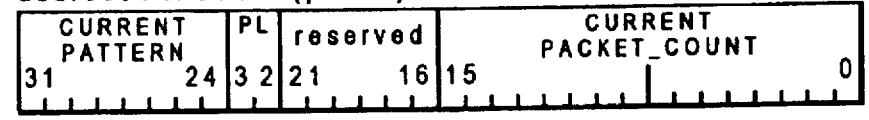
FIG. 8 illustrates the isochronous transmit current data size B working register port N.
Figure 9:
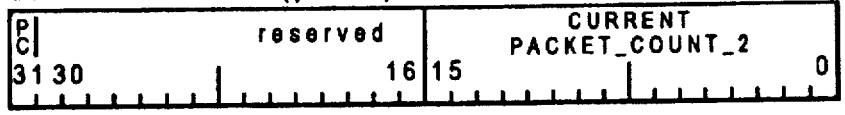
FIG. 9 illustrates the transmit data register isochronous transmit current data size C working register port N.

The next transmit data register is Isochronous Transmit Current Data Size B Working Register Port n, which is depicted in FIG. 8. This register is not modified by the system when the channel is active. Instead, the contents of the register are dynamically modified during isochronous operations. The contents may be accessed by the system for diagnostic purposes at that time. When the Isochronous Transmit Data Size B Register Port n is written by the system, the link to link logic copies the contents of that register into this one to initialize it. Once this channel is activated, this register is used to store intermediate results from the packet size calculations. The same occurs for the next transmit data register Isochronous Transmit Current Data Size C Working Register Port n, which is depicted in FIG. 9, and performs the same function for the C register as is performed by the B register in FIG. 8.

Before the system can attempt any transmit packets size calculations for an isochronous channel, the system must load Isochronous Transmit Data Size Registers A, B, and C for the Isochronous channel. When the system loads Isochronous Channel B and C, the system copies the data to the Isochronous Transmit Current Data Size Working Registers B and C, respectively, as well. Next, after the system activates the channel, the system then performs the operations described in the flowchart depicted in FIG. 10 prior to each packet transmission to calculate the size of the data portion of the packet to be transmitted. This information is then used to generate the packet size field in the packet header and to fetch the correct number of data bytes from system memory to the on-chip transmit packet buffer. To minimize transmit underrun, this calculation is performed up to two packets ahead of the next opportunity to transmit packets for that channel.

Figure 10A:
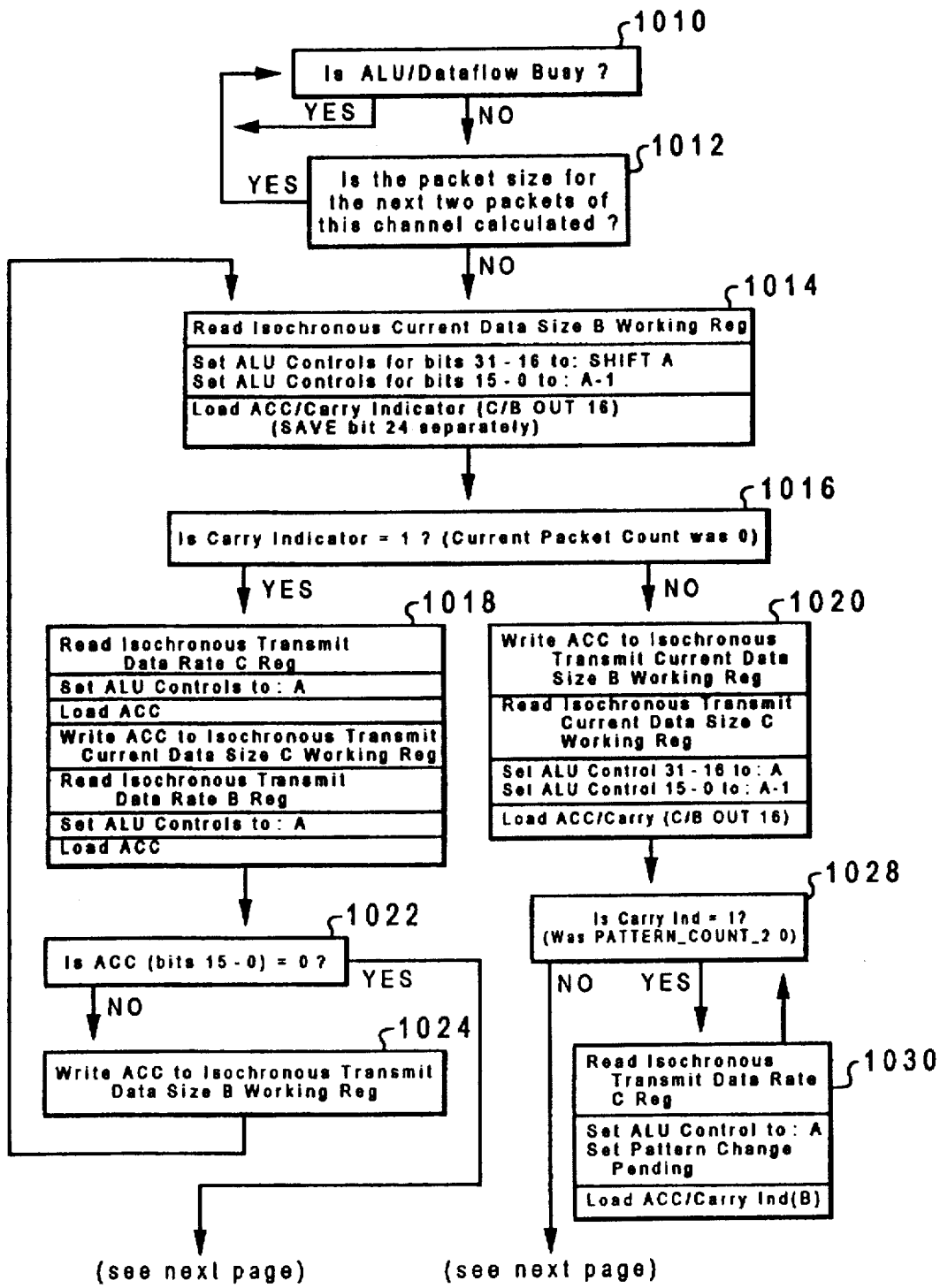
FIGS. 10A and B illustrate a flowchart that performs the operations prior to each packet transmission to calculate the size of the data portion of the packet to be transmitted.
Figure 10B:
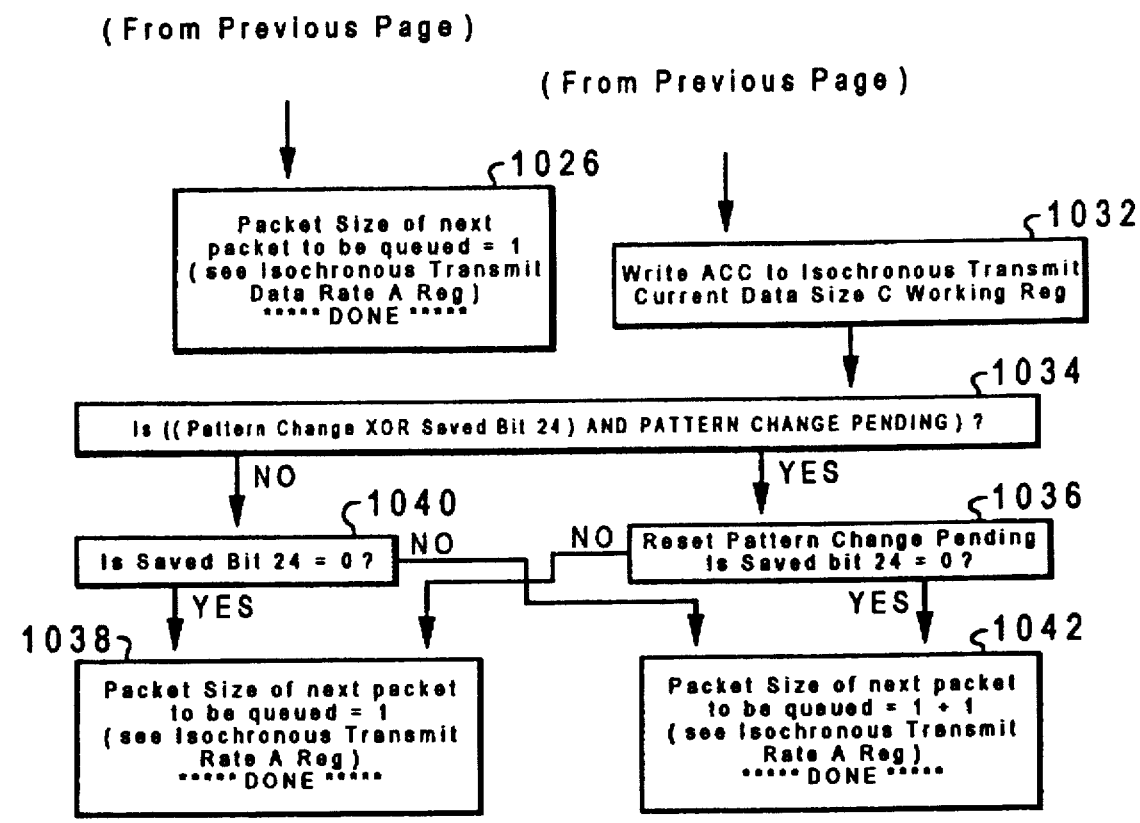
FIG. 10 is a block diagram of FIGS. 10A and B.

Referring to FIG. 10, step 1010, the system determines whether the ALU or dataflow is busy and if so continues to monitor until such a time that the dataflow ALU is not busy. At that time, the system proceeds to step 1012 where it is determined whether the packet size for the next two packets of this particular channel has been calculated and if so returns to step 1010. Otherwise, the system proceeds to step 1014 where the system reads the Isochronous Current Data Size B Working Register for setting the ALU Controls for bits 31-16 to shift A and for setting ALU Controls for bits 15-0 to A-1, and then the system loads the ACC/Carry Indicator (C/B Out 16) and saves bit 24 separately. Next, in step 1016, the system determines whether the Carry Indicator is equal to 1 and if so continues to step 1018, otherwise the system proceeds to step 1020.

In step 1018, the system reads the Isochronous Transmit Data Rate C Register and sets the ALU controls to A load ACC and write ACC to Isochronous Transmit Current Data Size C Working Register, read isochronous transmit data rate B register, set ALU controls to A and load ACC. Next, in step 1022, the system determines whether the ACC (bits 15-0) have reached zero. If not, the system, in step 1024, writes the ACC to Isochronous Transmit Data Size B Working Register and then returns to step 1014. If yes, the system proceeds to step 1026 where the system determines that the packet size of the next packet to be queued equals 1, which refers to the Isochronous Transmit Data Rate A Register and then the system is done.

In step 1020, the system writes the ACC to Isochronous Transmit Current Data Size B Working Register, reads the Isochronous Transmit Current Data Size C Working Register, sets the ALU control 31-16 to A, sets ALU control 15-0 to A minus 1, and loads the ACC/carry (C/B out 16). Next, in step 1028, the system determines whether the carry IND is set to 1 meaning, was the PATTERN_COUNT_2 equal to zero. If yes, the system, in step 1030, reads the Isochronous Transmit Data Rate C Register, sets the ALU control to A, sets the pattern change pending, and loads the ACC/carry IND (zero) before returning to step 1028. If the carry IND is set to 1, the system proceeds to step 1032 where the system writes the ACC to Isochronous Transmit Current Data Size C Working Register. In step 1034, the system determines whether the ((pattern change XOR saved bit 24) AND pattern change pending), which is a logic function of "pattern change", "pattern change pending", and "saved bit 24", is enabled and if so proceeds to step 1036. In step 1036, the system determines whether the reset pattern change pending is saved bit 24 as zero and if not proceeds to step 1038. In step 1038, the system sets the packet size of the next packet to be queued equal to 1 (see Isochronous Transmit Rate A Register before completion). If the save bit 24 of step 1036 is zero, the system proceeds to step 1042, where the system establishes the packet size of the next packet to be queued equal to l+1 (see Isochronous Transmit Rate A Register) and then the system is finished. If, in step 1034, the decision is no, the system proceeds to step 1040 where the system determines whether the save bit 24 is set to zero and if so proceeds to step 1038, otherwise the system proceeds to step 1042, and the systems ends upon the completion of either step.

The state machine depicted in the flow chart of FIG. 10 and depicted in FIG. 4 can be made serially reusable so that it can produce packet size calculations for multiple transmit channels. Also, when this state machine is not using the ALU and dataflow for performing its calculations, other state machines can use the same ALU and dataflow for their calculations. Yet another state machine can be implemented to insure that only one state machine attempts to use this dataflow at any one time and to prioritize among the state machines contending for use of these resources.

One example of other uses for this dataflow include the calculations of byte count and starting address for receive data DMA store, transmit data DMA fetch, and control block DMA fetch operations. Another example is the comparison of cycle timer to program cycle count (for any channel) to allow programmed events to occur on a particular cycle number. Also, the system using the dataflow make calculations each time a packet of data is sent on a channel, whether a synchronization code should be sent in the SY field of the header according a programmed synch count value, which can be programmed for any channel. Further, the dataflow may be used for storage and retrieval of intermediate address/byte count values to permit a receive state machine to suspend its operation while receipt of a packet is in progress. It can then resume from where it suspended, or restart from the receive bus state at the beginning of the packet if a CRC error is detected during the receipt of the packet.

Figure 11:
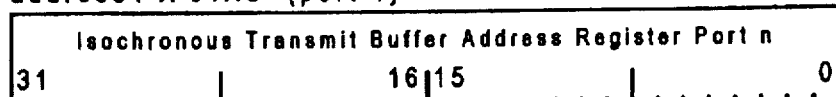
FIG. 11 illustrates an isochronous transmit buffer address register port N is depicted.

Additional isochronous port registers involved in ALU operations are illustrated in FIGS. 11–22. In FIG. 11, an Isochronous Transmit Buffer Address Register Port n is depicted. When the link chip fetches a transmit control block for port N, the buffer address pointer is stored here. As data for isochronous packets is fetched from this buffer, this register is incremented by the amount of data being fetched, thereby pointing to the beginning of the remaining data to be fetched from the buffer.

Figure 12:
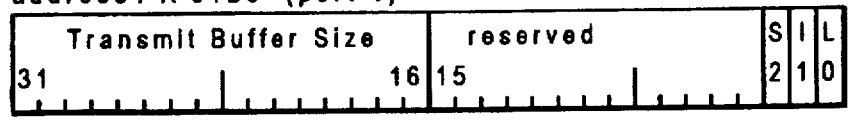
FIG. 12 depicts an isochronous transmit buffer size register port N, which is used when the link chip fetches a transmit control block for port N, the buffer size quadlet is stored here.

FIG. 12 depicts an Isochronous Transmit Buffer Size Register Port n, which is used when the link chip fetches a transmit control block for port n, the buffer size quadlet is stored here. As data for isochronous packets is fetched from this buffer, the buffer size field of this register is decremented by the amount of data being fetched, thereby containing the size of the remaining data to be fetched from the buffer.

Figure 13:
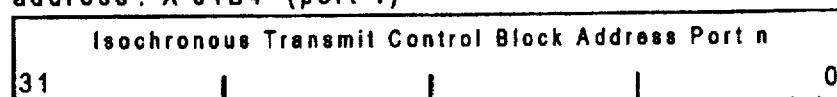
FIG. 13 depicts the isochronous transmit control address register for N, which holds the 32 bit address of the next isochronous buffer control block.

FIG. 13 depicts the Isochronous Transmit Control Address Register Port n, which holds the 32 bit address of the next isochronous buffer control block.

FIG. 14 depicts the Isochronous Transmit Seconds/Cycle Count Register Port n, which uses a seconds/cycle count bits block to identify the P1394 cycle number on which an event, such as a pause, resume, start, or stop, is to occur on this channel. The reserve block must be set to 0 when written and the contents of this field are "don't care" when read.

FIG. 15 depicts an Isochronous Transmit Synch Period Register Port n, which is used to identify the number of packets to be transmitted from one start of synch packet to the next start of synch packet on this channel. If the register is '0', the start of synch is to be sent only on the first packet of the stream. Otherwise, the start of synch is to be sent from the first packet and one the packet number equal to (n X Synch Period) where N is a positive integer.

FIG. 16 depicts an Isochronous Receive Buffer Address Register Port n, which is used to store the buffer address pointer when the link chip fetches a receive control block for port N. As data from isochronous packets is stored into this buffer, this register is incremented by the amount of data being stored, thereby pointing to the beginning of the remaining buffer into which data has not yet been stored.

The register in FIG. 17 depicts an Isochronous Receive Buffer Size Register Port n, which is used to store the buffer side quadlet when the logic chip fetches a receive control block for port N. As data for isochronous packets are stored into this buffer, the buffer size field of this register is decremented by the amount of data being stored, thereby containing the size of the remaining buffer into which data has not yet been stored.

Figure 18:
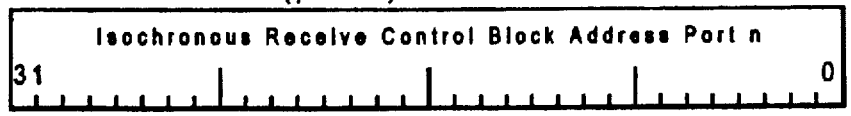
FIG. 18 depicts an isochronous receive control address register port N, which holds the 32 bit address of the next isochronous buffer control block.

FIG. 18 depicts an Isochronous Receive Control Address Register Port n, which holds the 32 bit address of the next isochronous buffer control block. When the link chip fetches a receive control block for port N, the control block address pointer is overwritten with the next control block address field from the control block fetched.

Figure 19:
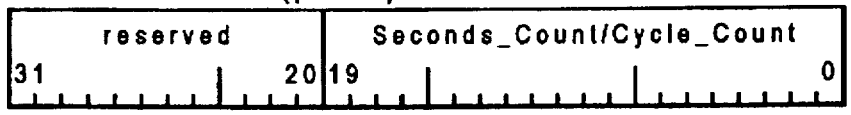
FIG. 19 depicts an isochronous receive second/cycle count register port N where the second/cycle count field identified the P1394 cycle number on which an event is to occur on this channel.

FIG. 19 depicts an Isochronous Receive Second/Cycle Count Register Port n where the second/cycle count field identified the P1394 cycle number on which an event, such as a pause, resume, start, or stop, start on SOS after cycle number, stop on SOS cycle number, is to occur on this channel. The reserved field must be set to 0 when written and the contents of this field are "don't care" when read.

Figure 20:
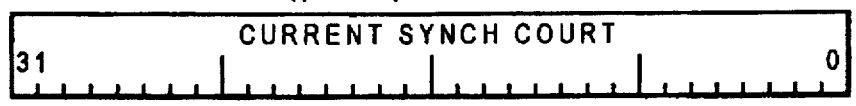
FIG. 20 depicts an isochronous transmit current synch count working register port N which is not overwritten when the channel is active.

FIG. 20 depicts an Isochronous Transmit Current Synch Count Working Register Port n which is not overwritten when the channel is active. These contents are dynamically modified by the logic chip during isochronous operations. These contents may be accessed by the system for diagnostic purposes. Further, when the transmit synch period register port N is written by the system, the link chip copies the contents of that register into this register to initialize it. Once this channel is activated, this register is used to store intermediate results from the synch calculations.

The ability to transmit at any data rate may also be selectively enabled or disabled be of the use of a currently unused bit in the control block. In implementing a specified data rate where R=1+N/D the system generates a transmission rate R1=1+N1/D1, where R1 is greater than R, meaning that N1/D1 is greater than N/D, by the smallest amount possible. This difference introduces an error over time of N1/D1−N-D bytes per packet. This is also expressed as 8,000X (N1/D1−N/D) bytes per second, since there are eight thousand packets per second on an isochronous channel. Accordingly, the system can calculate the deviation over time that the system introduces into the transmit data rate. Using this information, the system can use this information to suspend periodically the operation of the system and transmit data at rate 1 for a fixed number of packets to compensate for the error introduced by the system.

For example, after one second of transmission at a rate of 1+N1/D1, the system would cause the transmission to occur at a rate of 1 bytes per second for 8,000X (N1/D1−N/D) packets (to the nearest whole packet, with any residue saved to be added to the next calculation of deviation over time). After this next second of transmission losses would occur, followed by another system generated correction of 1 bits per second for 8,000X (N1/D1−N/D)+residue from previous correction calculation (packets) (to the nearest whole packet). This calculation is cumulative for each second.

Figure 21:
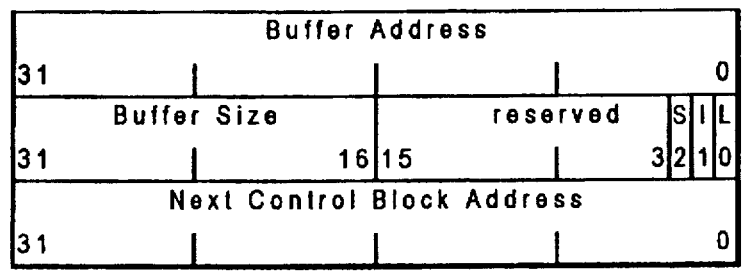
FIG. 21 is a format for an isochronous data buffer control block.
Figure 22:
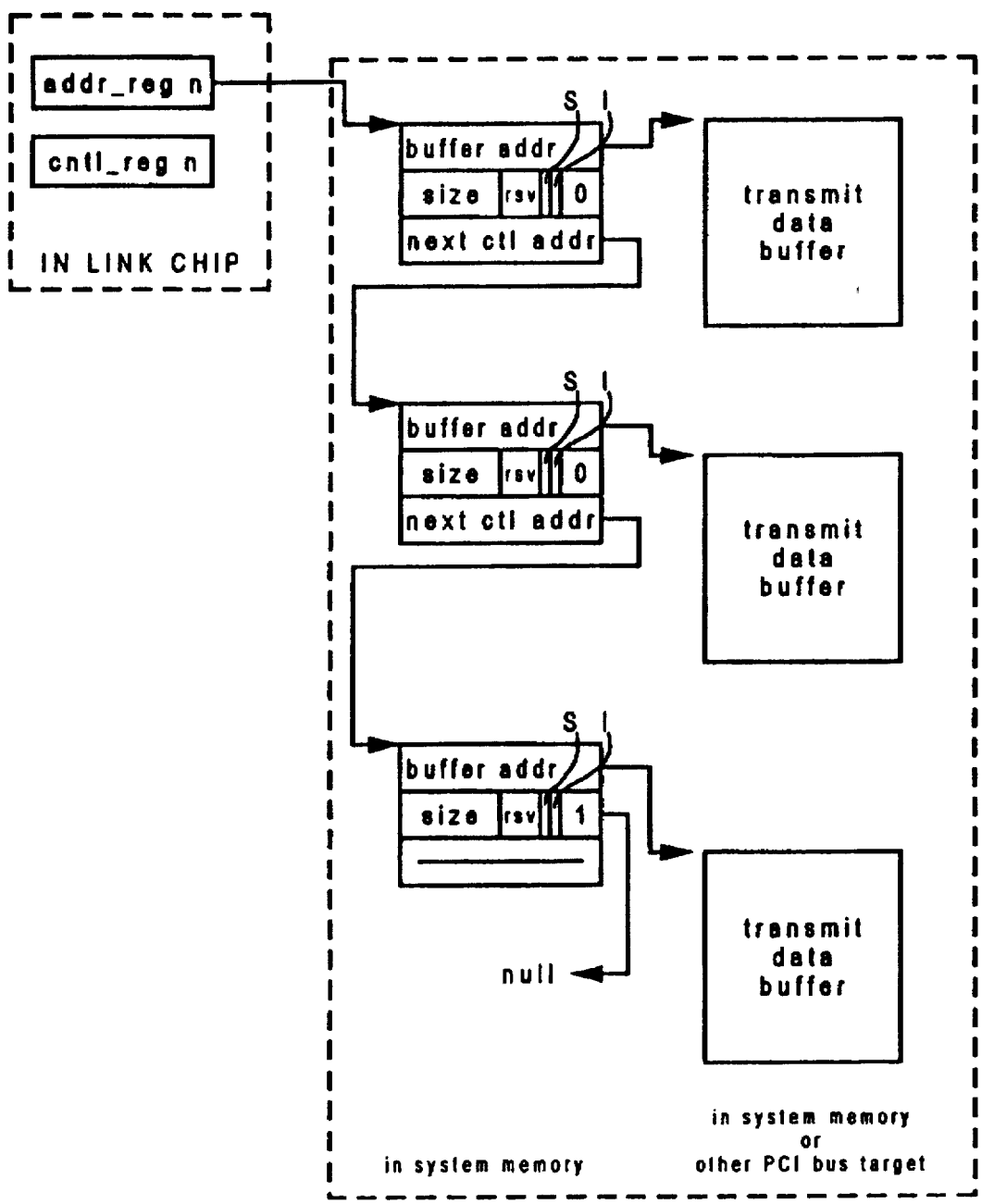
FIG. 22 depicts an isochronous transmit link list supported by the link chip, including the link (L) bit, the suspend (S) and the interrupt (I) bits.
Figure 23:
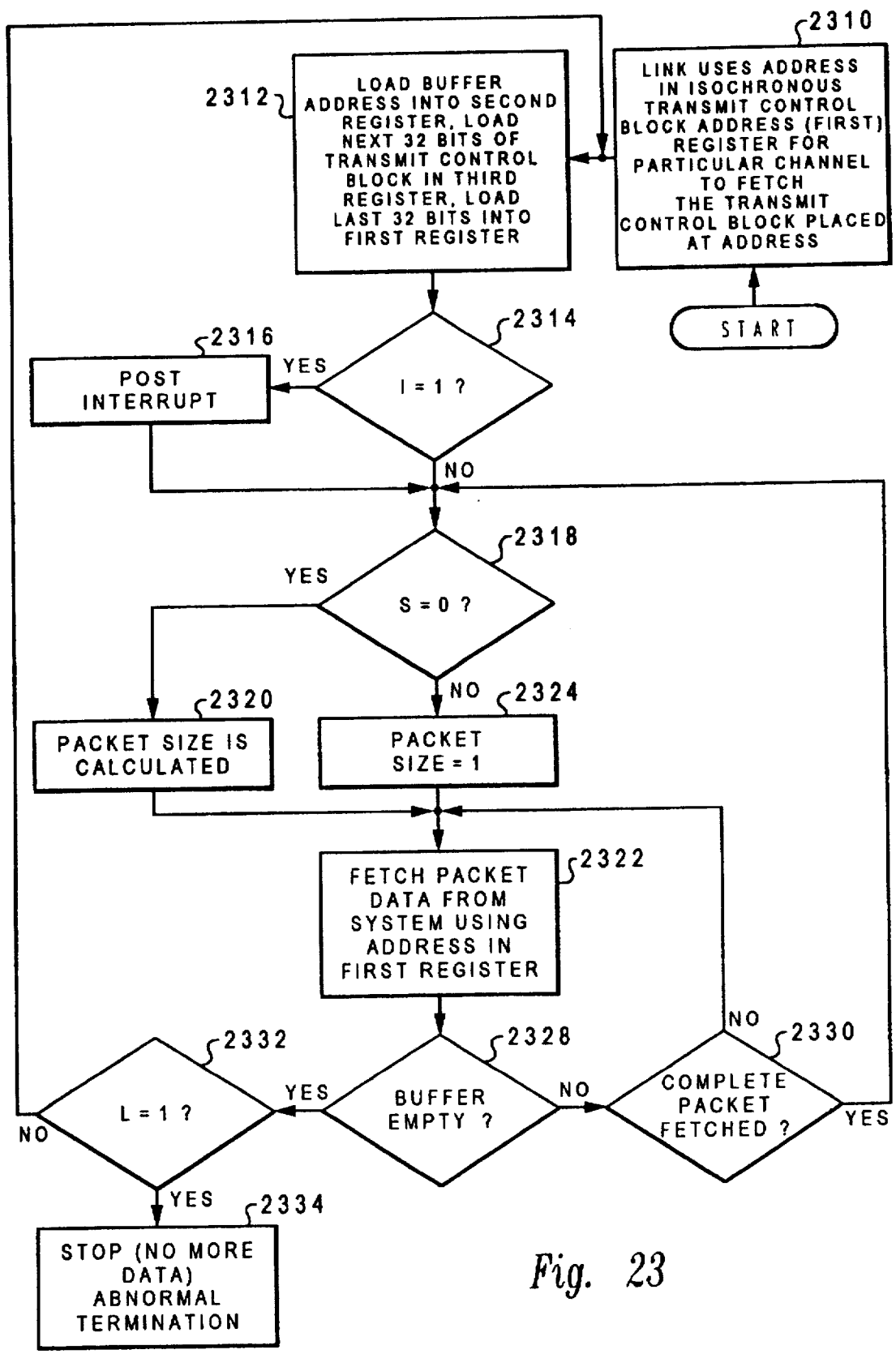
FIG. 23 is a flowchart illustrating the operation link list of FIG. 22.

FIG. 21 depicts the format for an isochronous data buffer control block. FIG. 22 depicts an isochronous transmit link list supported by the link chip, including the link (L) bit, the suspend (S), and the interrupt (I) bits. FIG. 23 is a flowchart illustrating the procedure that allows the system to perform the correction in transmission rate that is embedded in the control block structure for isochronous data transmission. This control block format (FIG. 21) is used to fetch data from a data buffer to transmit in packets on an isochronous channel, as shown in step 2310. The link chip is programmed by the system with the address of the first control block in a chain of control blocks for an isochronous channel, which includes the channel data transmission rate, R1=I+N1/D1 (step 2310). Then, when the isochronous channel is activated (step 2310), the link chip, in step 2312, fetches the first transmit block from system memory starting at the address contained in the Isochronous Transmit Control Block Address Register (FIG. 13). The first 32 bits of the transmit control block in turn would contain the address (FIG. 21) of the first data buffer containing data to be transmitted. The buffer address is loaded into a second register, the Isochronous Transmit Buffer Address Register (FIG. 11). The next 32 bits of the transmit control block are loaded into a third register shown in FIG. 12 and the last 32 bits, or Next Control Block Address are loaded into the first or Isochronous Transmit Control Block Address Register of FIG. 13. In step 2314, the bit I='1' causes an interrupt to be posted following the fetch of the control block, but is not relevant to the mechanism of this solution. After posting the interrupt (step 2316) then proceed to step 2318.

In step 2318, the suspend bit (S) is added to the control block so that when S equals '0' for the control block fetched, the system then determines, in step 2320, the transmit packet size packets, whose packet headers are generated after this control block is fetched (step 2322), but before the next one is enabled. When S='1' for the control block fetched (step 2318), all packets whose headers am generated after this control block are fetched (step 2322), but before the next one are 1 bytes long (step 2324) and the operation of the previously described method for determining packet size is suspended until a control block is fetched with S='0'. The system then structures the transmit data buffers and control blocks so that a fixed amount of data is transmitted for a calculable amount of time in data buffers pointed to or by control blocks with S='0', and then a fixed amount of data can be placed in transmit data buffers whose control blocks have S='1' to perform a periodic system correction on the previously described method.

The link chip then fetches the transmit data from the data buffer for subsequent transmit packets on that isochronous channel until that buffer is exhausted (step 2328). The link chip would then use the next control block address to fetch the next control block in the chain (step 2330); unless the end of the chain had been reached (step 2334), meaning that the link bit (L) is set to 1 (step 2332).

While the invention has been particularly shown and described with reference to a preferred embodiment, it will be understood by those skilled in the art that various changes in form and detail may be made therein without departing from the spirit and scope of the invention.

TABLE I

| N/D | (patterns) | byte_count | PC | (byte_count_2) |
|---|---|---|---|---|
| 1/80 | (00000000) | 80 | 1 | (80) |
| 2/80 | (00000000) | 80 | 1 | (40) |
| 3/80 | (00000000) | 80 | 1 | (27) |

TABLE I-continued

| N/D | (patterns) | byte_count | PC | (byte_count_2) |
|---|---|---|---|---|
| 4/80 | (00000000) | 80 | 1 | (20) |
| 5/80 | (00000000) | 80 | 1 | (16) |
| 6/80 | (00001000) | 80 | 0 | (20) |
| 7/80 | (00001000) | 80 | 0 | (27) |
| 8/80 | (00001000) | 80 | 0 | (40) |
| 9/80 | (00001000) | 80 | 0 | (80) |
| 10/80 | (00001000) | 80 | X | (0) |
| 11/80 | (00001000) | 80 | 1 | (80) |
| 12/80 | (00001000) | 80 | 1 | (40) |
| 13/80 | (00001000) | 80 | 1 | (27) |
| 14/80 | (00001000) | 80 | 1 | (20) |
| 15/80 | (00001000) | 80 | 1 | (16) |
| 16/80 | (00100100) | 80 | 0 | (20) |
| 17/80 | (00100100) | 80 | 0 | (27) |
| 18/80 | (00100100) | 80 | 0 | (40) |
| 19/80 | (00100100) | 80 | 0 | (80) |
| 20/80 | (00100100) | 80 | X | (0) |
| 21/80 | (00100100) | 80 | 1 | (80) |
| 22/80 | (00100100) | 80 | 1 | (40) |
| 23/80 | (00100100) | 80 | 1 | (27) |
| 24/80 | (00100100) | 80 | 1 | (20) |
| 25/80 | (00100100) | 80 | 1 | (16) |
| 26/80 | (01001001) | 80 | 0 | (20) |
| 27/80 | (01001001) | 80 | 0 | (27) |
| 28/80 | (01001001) | 80 | 0 | (40) |
| 29/80 | (01001001) | 80 | 0 | (80) |
| 30/80 | (01001001) | 80 | X | (0) |
| 31/80 | (01001001) | 80 | 1 | (80) |
| 32/80 | (01001001) | 80 | 1 | (40) |
| 33/80 | (01001001) | 80 | 1 | (27) |
| 34/80 | (01001001) | 80 | 1 | (20) |
| 35/80 | (01001001) | 80 | 1 | (16) |
| 36/80 | (01010101) | 80 | 0 | (20) |
| 37/80 | (01010101) | 80 | 0 | (27) |
| 38/80 | (01010101) | 80 | 0 | (40) |
| 39/80 | (01010101) | 80 | 0 | (80) |
| 40/80 | (10101010) | 80 | X | (0) |
| 41/80 | (10101010) | 80 | 1 | (80) |
| 42/80 | (10101010) | 80 | 1 | (40) |
| 43/80 | (10101010) | 80 | 1 | (27) |
| 44/80 | (10101010) | 80 | 1 | (20) |
| 45/80 | (10101010) | 80 | 1 | (16) |
| 46/80 | (10110110) | 80 | 0 | (20) |
| 47/80 | (10110110) | 80 | 0 | (27) |
| 48/80 | (10110110) | 80 | 0 | (40) |
| 49/80 | (10110110) | 80 | 0 | (80) |
| 50/80 | (10110110) | 80 | X | (0) |
| 51/80 | (10110110) | 80 | 1 | (80) |
| 52/80 | (10110110) | 80 | 1 | (40) |
| 53/80 | (10110110) | 80 | 1 | (27) |
| 54/80 | (10110110) | 80 | 1 | (20) |
| 55/80 | (10110110) | 80 | 1 | (16) |
| 56/80 | (11011101) | 80 | 0 | (20) |
| 57/80 | (11011101) | 80 | 0 | (27) |
| 58/80 | (11011101) | 80 | 0 | (40) |
| 59/80 | (11011101) | 80 | 0 | (80) |
| 60/80 | (11011101) | 80 | X | (0) |
| 61/80 | (11011101) | 80 | 1 | (80) |
| 62/80 | (11011101) | 80 | 1 | (40) |
| 63/80 | (11011101) | 80 | 1 | (27) |
| 64/80 | (11011101) | 80 | 1 | (20) |
| 65/80 | (11011101) | 80 | 1 | (16) |
| 66/80 | (11110111) | 80 | 0 | (20) |
| 67/80 | (11110111) | 80 | 0 | (27) |
| 68/80 | (11110111) | 80 | 0 | (40) |
| 69/80 | (11110111) | 80 | 0 | (80) |
| 70/80 | (11110111) | 80 | X | (0) |
| 71/80 | (11110111) | 80 | 1 | (80) |
| 72/80 | (11110111) | 80 | 1 | (40) |
| 73/80 | (11110111) | 80 | 1 | (27) |
| 74/80 | (11110111) | 80 | 1 | (20) |
| 75/80 | (11110111) | 80 | 1 | (16) |
| 76/80 | (11111111) | 80 | 0 | (20) |
| 77/80 | (11111111) | 80 | 0 | (27) |
| 78/80 | (11111111) | 80 | 0 | (40) |
| 79/80 | (11111111) | 80 | 0 | (80) |

I claim:

1. In a computer system having a plurality of nodes, each node being serially connected to at least one other node in said computer system via an acyclic-only bus, which nodes communicate one to another by transmitting communication packets having variable byte sizes, a method of specifying a packet size transmission rate comprising the following steps:

establishing an average transmission rate of bytes per packet;

determining an approximate value of said average transmission rate;

based on said approximate value, determining a periodic change in said average transmission rate for transmitting communication packets of l length or l+1 length;

based on said periodic change, selecting a repeating pattern for generating a sequence of packets representing said approximate value, wherein said sequence allows for an even transmission distribution of l and l+1 packets.

2. The method according to claim 1 wherein said selecting step further comprises the following steps:

checking said repeating pattern to determine whether said transmission rate should change from l to l+1 or vice versa; and changing said transmission rate upon indication that a change is necessary.

3. The method according to claim 1 wherein said transmission is done asynchronously.

4. The method according to claim 1 wherein said computer system includes multiple transmission channels through which said transmission packets are transmitted.

5. In a computer system having a plurality of nodes, each node being serially connected to at least one other node in said computer system via an acyclic-only bus, which nodes communicate one to another by transmitting communication packets having variable byte sizes, a system for specifying a packet size transmission rate comprising:

means for establishing an average transmission rate of bytes per packet;

means for determining an approximate value of said average transmission rate;

based on said approximate value, means for determining a periodic change in said average transmission rate for transmitting communication packets of l length or l+1 length;

based on said periodic change, means for selecting a repeating pattern for generating a sequence of packets representing said approximate value, wherein said sequence allows for an even transmission distribution of l and l+1 packets.

6. The system according to claim 5 wherein said selecting means further comprises:

means for checking said repeating pattern to determine whether said transmission rate should change from l to l+1 or vice versa; and means for changing said transmission rate upon indication that a change is necessary.

7. The system according to claim 5 wherein said transmission is done asynchronously.

8. The system according to claim 5 wherein said computer system includes multiple transmission channels through which said transmission packets are transmitted.

* * * * *

UNITED STATES PATENT AND TRADEMARK OFFICE
CERTIFICATE OF CORRECTION

PATENT NO. : 5,706,439
DATED : January 6, 1998
INVENTOR(S) : Parker

It is certified that error appears in the above-indentified patent and that said Letters Patent is hereby corrected as shown below:

Column 6, line 23: change "W/8" to --W/6--

Signed and Sealed this

Twenty-fourth Day of March, 1998

Attest:

BRUCE LEHMAN

*Attesting Officer*          *Commissioner of Patents and Trademarks*